(12) United States Patent
Woodhead et al.

(10) Patent No.: US 10,735,521 B1
(45) Date of Patent: Aug. 4, 2020

(54) IOT NETWORK CONTROLLER / SERVER

(71) Applicant: Senet, Inc., Portsmouth, NH (US)

(72) Inventors: Jamie R. Woodhead, Pelham, NH (US); David L. Kjendal, Durham, NH (US)

(73) Assignee: Senet, Inc., Portsmouth, NH (US)

( * ) Notice: Subject to any disclaimer, the term of this patent is extended or adjusted under 35 U.S.C. 154(b) by 0 days.

(21) Appl. No.: 16/196,011

(22) Filed: Nov. 20, 2018

Related U.S. Application Data (60) Provisional application No. 62/588,595, filed on Nov. 20, 2017.

(51) Int. Cl.
*H04L 29/08* (2006.01)

(52) U.S. Cl.
CPC .............. *H04L 67/12* (2013.01); *H04L 67/02* (2013.01); *H04L 67/1002* (2013.01); *H04L 67/2842* (2013.01)

(58) Field of Classification Search
CPC . H04L 67/12; H04L 67/2842; H04L 67/1027; G16Y 30/00
See application file for complete search history.

(56) References Cited

U.S. PATENT DOCUMENTS

| | | | |
|---|---|---|---|
| 8,041,335 B2 | 10/2011 | Khetawat | |
| 2013/0242757 A1 | 9/2013 | Tsai | |
| 2016/0112870 A1 | 4/2016 | Pathuri | |
| 2017/0149614 A1* | 5/2017 | Zheng | H04L 67/12 |
| 2017/0315820 A1* | 11/2017 | Entezari | H04L 67/12 |
| 2018/0115652 A1 | 4/2018 | Russell | |
| 2018/0373505 A1* | 12/2018 | Engquist | G06F 8/40 |

OTHER PUBLICATIONS

Office Action dated May 14, 2020 for U.S. Appl. No. 16/403,898, 9 Pages.
Office Action dated Jun. 9, 2020 for U.S. Appl. No. 16/206,396, 24 Pages.

* cited by examiner

*Primary Examiner* — Nam T Tran
(74) *Attorney, Agent, or Firm* — Maine Cernota & Rardin

(57) ABSTRACT

A system and method for a software defined Internet of Things (IoT) Network Controller/Server including Network Controller Instances, a Network Controller Cluster, Application Controller Instances, Northbound and Southbound APIs, Uplink and Downlink Processor instances, and a Network Database. The invention leverages web-oriented technologies for a large horizontally scalable and highly available system. Horizontal scaling is accomplished by Network Controller instances which dynamically increases throughput for uplink and downlink processing. The event-driven architecture is coordinated through a distributed cache. Only Critical events are persisted as part of event processing; all others are stored in a cache and scheduled for persistence.

19 Claims, 4 Drawing Sheets

IoT CONTROLLER / SERVER COMPONENT OVERVIEW

INTERNET OF THINGS OPERATIONAL ENVIRONMENT

IoT CONTROLLER / SERVER COMPONENT OVERVIEW

FIG. 3

IoT CONTROLLER / SERVER COMPONENT DETAILS

FIG. 4

IOT NETWORK CONTROLLER / SERVER

RELATED APPLICATIONS

This application claims the benefit of U.S. Provisional Applications No. 62/588,595 filed Nov. 20, 2017, which is herein incorporated by reference in its entirety for all purposes.

FIELD OF THE DISCLOSURE

The disclosure relates to a system and method in the field of the Internet of Things and, more particularly, to a software defined IoT Network Controller/Server system.

BACKGROUND

The Internet of Things (IoT) refers to the network of physical objects with Internet connectivity (connected devices), and the communication between them. These Internet-enabled devices and systems collect and exchange data. IoT has been defined as "the infrastructure of the information society". IoT extends Internet connectivity beyond traditional devices such as desktop and laptop computers and smart phones to a range of devices and everyday things that use embedded technology to communicate and interact with the external environment via the Internet.

There are great challenges to connecting such devices, as their numbers are in the billions, and many operate in critical systems. Scalability, security, and availability are critical attributes. Without these, delays can make applications unusable, and security breaches can risk data and much worse. Availability particularly can require devices to operate reliably, without intervention, over multiple years. Power consumption can be critical to support multi-year operation. Particularly, Low Power Wide Area Network (LPWAN) devices are expected to operate for ten or more years. Given the large numbers, cost can also be a critical factor. If costs per device are too high, entire fields of applications can be out of reach.

What is needed is a system and method for a dynamically scalable infrastructure that provides secure, low-cost, low-power, highly available communications between connected devices.

SUMMARY

An embodiment provides a system for an Internet of Things (IoT) Network Controller/Server comprising at least one Application Controller (AC) Instance (305); a Network Controller Cluster (NC) (320) interfacing through Load Balancers (335, 340); the Network Controller Cluster (320) comprising at least one Network Controller (NC) Instance (325); a Network Database (345); a Northbound API (375) through which at least one Application Controller Instance (305) communicates with at least one Network Controller Cluster (320); at least one Gateway (365); a Southbound API (380) through which at least one Gateway (365) communicates with the Network Controller Cluster (320); and at least one Device (350) in communication with at least one Gateway (365). In embodiments, at least one NC Instance (325) comprises highly available storage to persist network session information. In other embodiments, at least one NC Instance (325) comprises highly available storage comprising a Mongo Cluster to persist network session information. Subsequent embodiments comprise a Key Management Service (315) interfaced with at least one Application Controller (305). For additional embodiments the Key Management Service (315) is external. In another embodiment, only critical events are persisted as part of event processing, all others are stored in a cache and scheduled for persistence. For a following embodiment, at least one of the NC Instances (325) the AC Instances (305) comprises a Representational State Transfer (REST) (420) web services interface. In subsequent embodiments, at least one of the AC Instances (305, 310 . . . ) is deployed internally to the NC (325). In additional embodiments, at least one of the AC Instances (305, 310 . . . ) is deployed as an external system. In ensuing embodiments at least one of the AC Instances (305) decrypts application uplink messages and encrypts application downlink messages. In included embodiments the Network Database (345) comprises storing Device network session information, Device profiles, and Gateway configuration parameters. In yet further embodiments, Messages are sent from at least one NC Instance (325) to at least one of the GW (365) by a state-full Web Socket connection. In related embodiments, at least one of the AC instances (305) persists session information on at least one of a Key Management Service (315) and locally in an Application Database. Further embodiments comprise at least one Uplink Processor (ULP) Instance (430), functions of at least one ULP Instance (430) comprising handling messages from the GW to the NC, the messages containing application data and/or session management information; establishing at least one session; managing security keys between the AC, the NC, and the Device; managing session parameters with the Device to optimize communication on an RF network; deduplication of the messages from the Devices for delivery to the AC; nomination of one of at least one GW (365) to be used by a Downlink Processor (DLP) for one of the at least one Devices (350); and discovery of Application Controller Services.

Another embodiment provides a method for an Internet of Things (IoT) Network Controller/Server comprising providing at least one Application Controller (AC) Instance (305); providing a Network Controller Cluster (NC) (320) interfacing through Load Balancers (335, 340); the Network Controller Cluster (320) comprising at least one Network Controller (NC) Instance (325); providing a Network Database (345); providing a Northbound API (375) through which at least one Application Controller Instance (305) communicates with at least one Network Controller Cluster (320); providing at least one Gateway (365); providing a Southbound API (380) through which at least one Gateway (350) communicates with the Network Controller Cluster (320); and providing at least one Device (350) in communication with at least one Gateway (350). Yet further embodiments comprise providing at least one Downlink Processor (DLP) Instance (450), functions of at least one DLP Instance (450) comprising queuing messages from the NC or the AC to the GWs/Devices; delivering messages from the NC or the AC to the GWs/Devices; wherein the messages from the NC contain session configuration information and the messages from the AC contain application data. For more embodiments, the Southbound API (380) communications comprise load-balanced messages across the NC Instances (325) based on Device ID; and wherein the messages are sent from the NC to the GW via a state-full Web Socket connection to one of the NC instances. In continued embodiments the Northbound API (380) communications comprise load-balanced requests across the NC Instances (325). For additional embodiments, each NC Instance (325) comprises at least one of service discovery (445) and network session management (435).

A yet further embodiment provides an apparatus for an Internet of Things (IoT) Network Controller/Server comprising at least one Application Controller (AC) Instance (305); a Network Controller Cluster (NC) (320) interfacing through Load Balancers (335, 340); the Network Controller Cluster (320) comprising at least one Network Controller (NC) Instance (325); a Network Database (345); a Northbound API (375) through which at least one Application Controller Instance (305) communicates with at least one Network Controller Cluster (320); at least one Gateway (365) device; a Southbound API (380) through which at least one Gateway device (350) communicates with the Network Controller Cluster (320); and at least one Device (350) in communication with at least one Gateway (350).

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Embodiments leverage standard web-oriented technologies used to build large horizontally scalable and highly available systems. They horizontally scale through the addition of Network Controller instances which dynamically increases throughput for uplink and downlink processing. The event-driven architecture is coordinated through a distributed cache. In one embodiment example, a distributed cache comprises Redis. In embodiments, only critical events are persisted as part of event processing, all others are stored in a cache and scheduled for persistence.

An Internet of Things (IoT) Network Controller/Server example has at least one Application Controller (AC) Instance; an optional Key Management Service interfaced with the at least one Application Controller; a Network Controller Cluster (NCC) interfacing through Load Balancers; the Network Controller Cluster comprising at least one Network Controller (NC) Instance; a Network Database; a Northbound API through which the at least one Application Controller Instance communicates with the at least one Network Controller Cluster; at least one Gateway; a Southbound API through which the at least one Gateway communicates with the Network Controller Cluster; and at least one Device in communication with the Gateway. The server/controller can include at least one NC Instance comprising highly available storage to persist network session information. In other examples, at least one NC Instance comprises a Mongo Cluster to persist network session information. In some examples, the Key Management Service is external. For additional examples only critical events are persisted as part of event processing, all others are stored in a cache and scheduled for persistence. In another example, the NC Instances comprise a Representational State Transfer (REST) web services interface. In other examples, the AC Instances comprise a Representational State Transfer (REST) web services interface. In subsequent embodiments, at least one of the AC Instances is deployed internally to the NC. In additional examples at least one of the AC Instances is deployed as an external system.

For another example, at least one of the AC Instances decrypts application uplink messages and encrypts application downlink messages. In some cases the Network Database comprises storing Device network session information, Device profiles, and Gateway configuration parameters. Messages can be sent from at least one NC Instance to at least one of the GW by a state-full Web Socket connection. At least one of the AC instances persists session information on the Key Management Service in examples. For further examples, at least one of the AC instances persists session information locally in an Application Database. In another example, at least one Uplink Processor (ULP) Instance handles messages from the GW to the NC. The messages contain application data and/or session management information; establish at least one session, manage security keys between the AC, the NC, and the Device; manage session parameters with the Device to optimize communication on an RF network. The ULP Instance can perform deduplication of the messages from the Devices for delivery to the AC; perform nomination of one of the GW to be used by a Downlink Processor (DLP) for one of the at least one Devices and discovery of Application Controller Services. Further examples have at least one Downlink Processor (DLP) Instance. Functions of the DLP Instance include queuing messages from the NC or the AC to the GWs/Devices, delivering messages from the NC or the AC to the GWs/Devices. The messages from the NC contain session configuration information and the messages from the AC contain application data. For more examples the Southbound API communications comprise load-balanced messages across the NC Instances based on Device ID and the messages are sent from the NC to the GW via a state-full Web Socket connection to one of the NC instances. In other examples the Northbound API communications comprise load-balanced requests across the NC Instances. For additional examples each of the NC Instances comprises service discovery. Another examples provides that each the NC Instance comprises network session management.

Figure 1:
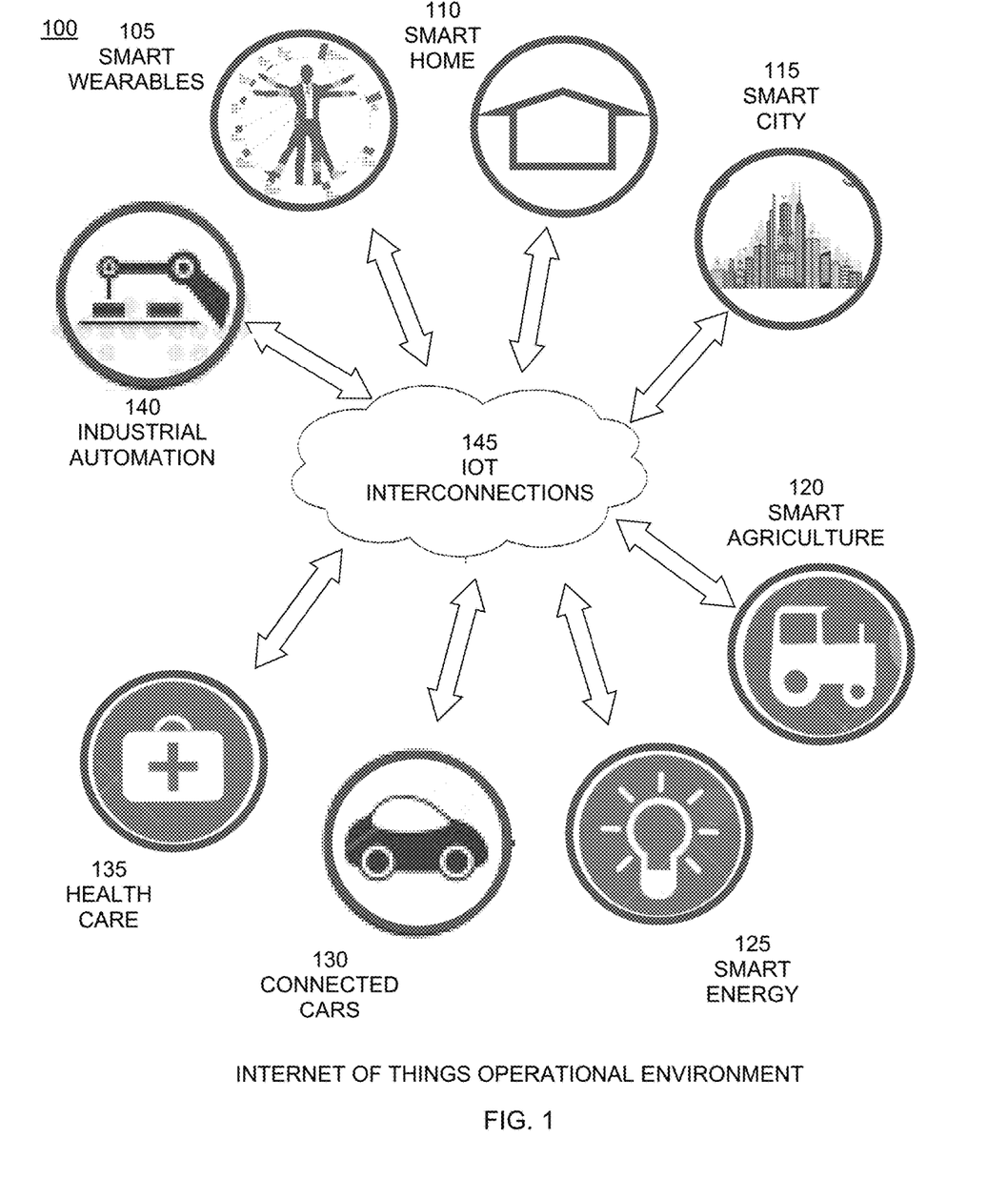
FIG. 1 depicts a general IoT operational environment configured in accordance with an embodiment of the invention.

FIG. 1 is a general IoT operational environment 100. Embodiments support IoT devices in the fields of smart wearables 105, smart home 110, smart city 115, smart agriculture 120, smart energy 125, connected cars 130, health care 135, and industrial automation 140. Each device in each field is interconnected 145 to support the applications relevant to each.

Figure 2:
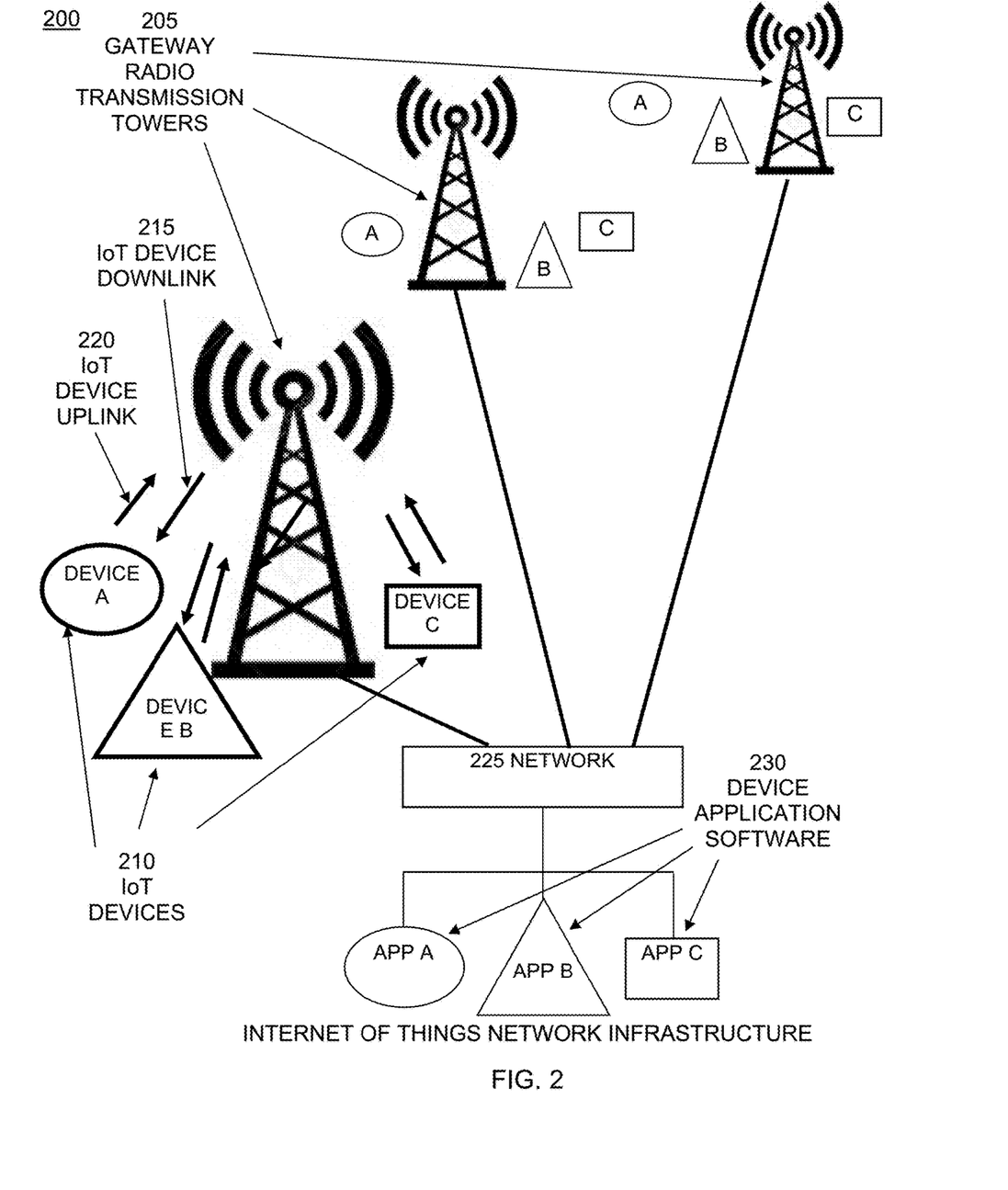
FIG. 2 depicts an IoT network infrastructure environment configured in accordance with an embodiment of the invention.

FIG. 2 portrays an IoT network infrastructure environment 200. Embodiments comprise Gateway RF transmitting/receiving towers 205 that communicate with IoT Devices 210 by RF downlinks 215 and RF uplinks 220.

Gateway Towers 205 interface with Network 225. Network 225 interfaces with IoT Application Software 230 corresponding to IoT Devices 210. IoT Devices 210 use RF (215, 220) to communicate with the Gateways via towers 205. The Gateways are backhauled over the Internet to the Network Controller. The Network Controller interfaces with the Application Controller which then sends the data for a specific Device to an Application.

Figure 3:
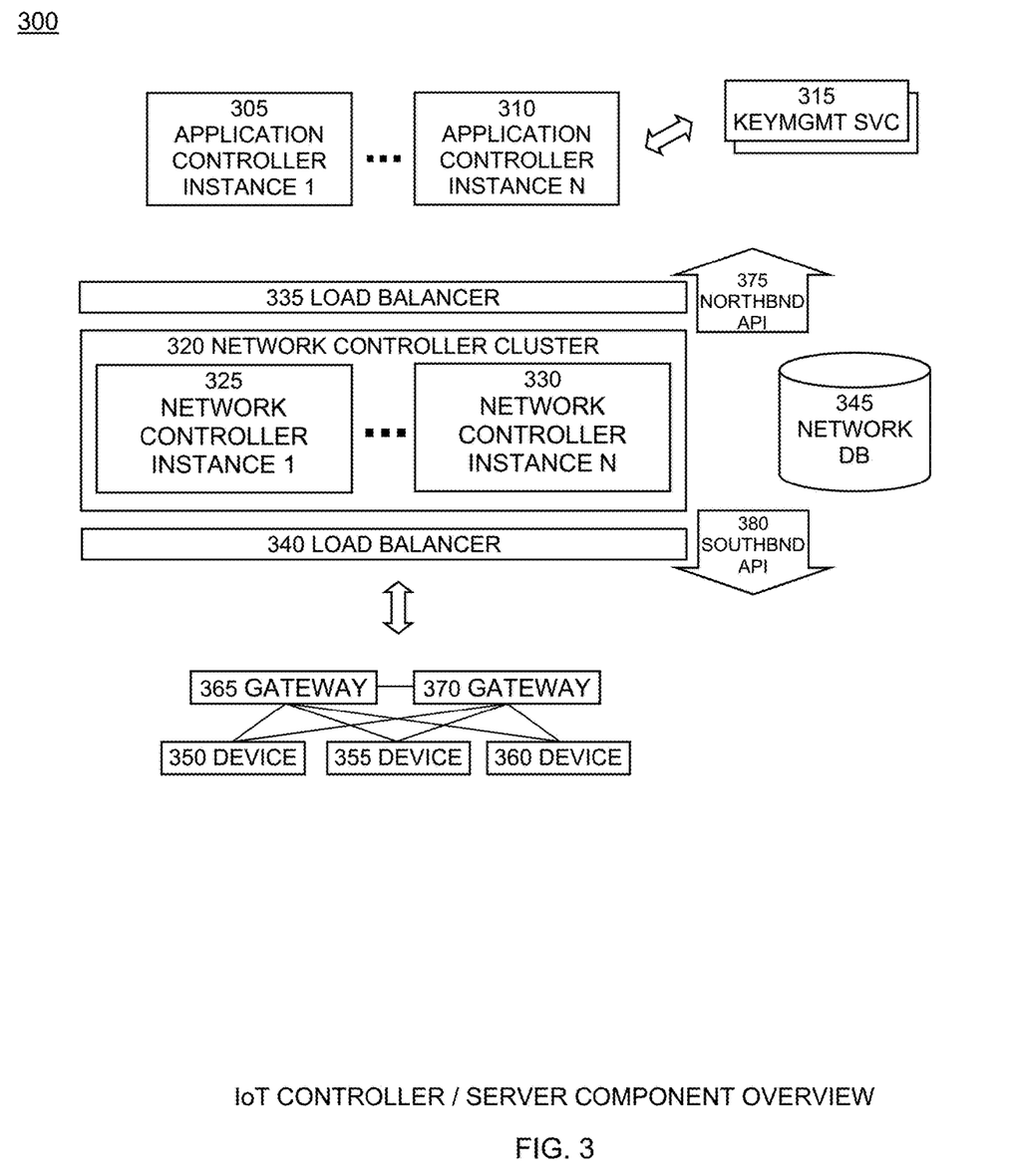
FIG. 3 depicts a high-level block diagram of a platform configured in accordance with an embodiment.

FIG. 3 is a high level block diagram 300. Embodiment components comprise Application Controller (AC) Instances such as Application Controller Instance 1 305 to Application Controller Instance N 310. Application Controller Instances 305 . . . 310 can either persist session information locally, or rely on an external Key Management Service 315. Network Controller Cluster (NCC) 320 comprises Network Controller (NC) Instances such as NC Instance 1 325 . . . to NC Instance N 330. Network Controller Instances 325 . . . 330 are placed behind Load Balancers 335 and 340. Network Database 345 stores Device 350, 355, 360 . . . network session information, Device 350, 355, 360 . . . profiles, and Gateway (GW) 365, 370 . . . configuration parameters. ACs 305, 310 . . . communicate with NCs 325 . . . 330 through Northbound interface 375. Gateways 365, 370 . . . communicate with the Network Controller Cluster 320 through Southbound API 380 over the internet.

Figure 4:
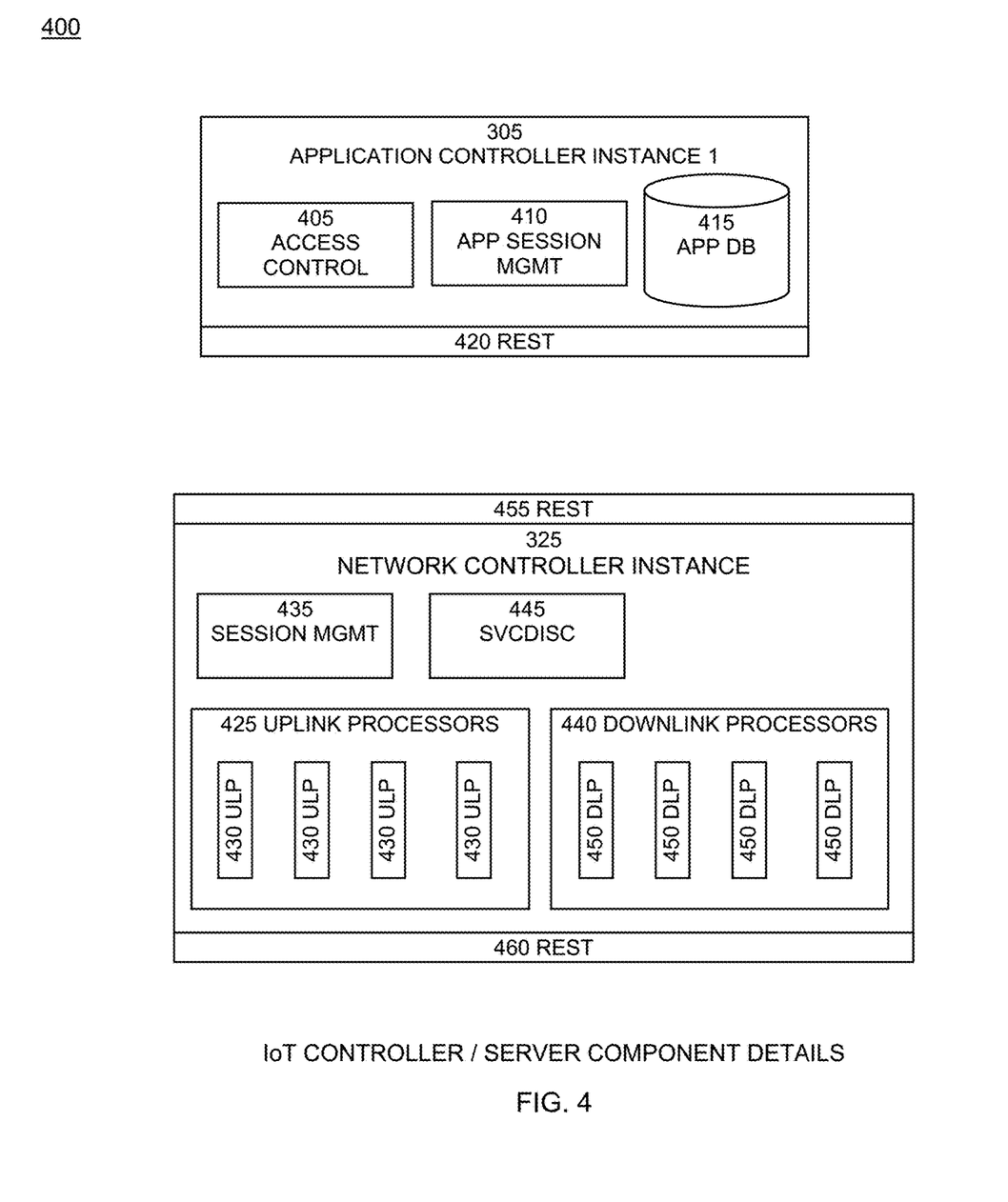
FIG. 4 provides detail block diagrams of an Application Controller and a Network Controller Instance configured in accordance with an embodiment.

FIG. 4 provides system details and block diagrams 400 for an Application Controller Instance 1 305 and a Network Controller Instance 325 of FIG. 3. An Application Controller Instance 305 . . . 310 is responsible for the services for a single application. An application is typically tied to a particular class of Device 350-360. In embodiments, the AC Instances 305-310 are deployed internally to the Network Controller or as an external system (as depicted) 305-310. Embodiments of the AC 305 are responsible for: 1) Network access control 405 for Devices 350, 355, 360 . . . by participating in the session establishment/management process 410 orchestrated by a Network Controller Instance 325 (AC 305 can optionally use an external Key Management Service 315); 2) Decrypting application uplink messages; 3) Encrypting application downlink messages; and 4) AC 305 can either persist session information locally in App DB 415, or rely on an external key management service 315. AC 305 communicates with NC 325 through the NC's Northbound interface 375. These requests are load-balanced 335 across NC instances 325 . . . 330. AC 305 also comprises Representational State Transfer (REST) web services interface 420.

The Network Controller (NC) 325 is the unit of scale. Instances 325, 330 . . . are placed behind load-balancers 335 and 340, and are coordinated through a distributed cache. NC 325 relies on highly available storage to persist network session information. NC 325 also comprises REST (Representational State Transfer) web services interfaces 455 and 460.

Gateways (GW) 365, 370 . . . communicate with Network Controller Cluster (NC) 320 through Southbound API 380. Messages are load-balanced 340 across NC instances 325-330 based on Device 350, 355, 360 . . . ID. Messages are sent from NCC 320 to GW 365, 370 . . . via a state-full Web Socket connection to one of the NC instances 325-330.

Uplink Processor 425 comprises Uplink Processor (ULP) instances 430. Devices are "hashed" to a particular ULP by the load balancer. UL from the same gateway can go to different ULPs; ULs are load balanced across gateways. These messages contain application data and/or session management information used by Session (Application & Network) Management 435. ULPs 430 are responsible for: 1) Session establishment and security key management between AC 305, the respective NC 325, and the respective Device 350; 2) Managing session parameters with the Device 350 to optimize communication on the RF network; 3) Deduplication of messages from devices 350, 355, 360 . . . for delivery to AC 305; and 4) Nomination of a GW 365, 370 . . . to be used by Downlink Processor 440 for a Device 350.

Downlink Processor 440 comprises Downlink Processor (DLP) instances 450 responsible for queuing and delivering messages from the NC 325 or AC 305 to GWs 365, 370 . . . /Devices 350, 355, 360 . . . . Messages from NC 325 contain session configuration information. Messages from AC 305 contain application data.

Network DB 345 stores 1) Device 350, 355, 360 . . . network session information and Device 350, 355, 360 . . . profiles and 2) Gateway 365, 370 . . . configuration parameters.

The computing system used in the Internet of Things (IoT) Network Controller/Server platform for performing (or controlling) the operations or functions described hereinabove with respect to the system and/or the method may include a processor, I/O devices, a memory system, and a network adaptor. The computing system includes program modules for performing (or controlling) the operations or functions described hereinabove with respect to the system and/or the method according to exemplary embodiments. For example, the program modules may include routines, programs, objects, components, logic, data structures, or the like, for performing particular tasks or implement particular abstract data types. The processor may execute instructions written in the program modules to perform (or control) the operations or functions described hereinabove with respect to the system and/or the method. The program modules may be programmed into the integrated circuits of the processor. In an exemplary embodiment, the program modules may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using a network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system for an Internet of Things (IoT) Network Controller/Server comprising:
   at least one Application Controller (AC) Instance (305);
   a network (225) comprising a Network Controller Cluster (NCC) (320) interfacing through Load Balancers (335, 340);
   said Network Controller Cluster (NCC) (320) comprising at least one Network Controller (NC) Instance (325);
   a network database memory comprising a Network Database (345);
   a Northbound API (375) through which said at least one Application Controller Instance (305) communicates with said at least one Network Controller Cluster (320);
   at least one Gateway (GW) device (205, 365);
   a Southbound API (380) through which said at least one Gateway (GW) device (365) communicates with said Network Controller Cluster (320);
   at least one IoT Device (210, 350) in communication with said at least one Gateway (GW) device (205, 365); and
   at least one Uplink Processor (425) comprising a processor device, wherein said at least one Uplink Processor (425) comprises at least one UpLink Processor (ULP) Instance (430), wherein said processor device of said at least one Uplink Processor (425) executes functions of said at least one ULP Instance (430) comprising:
      handling messages from said GW device (205, 365) to said NC, said messages containing application data and/or session management information;
      establishing at least one session;
      managing security keys between said AC, said NC, and said IoT Device (210, 350);
      managing session parameters with said IoT Device (210, 350) to optimize communication on an RF network;
      deduplication of said messages from said IoT Devices (210, 350) for delivery to said AC;
      nomination of one of said at least one GW device (205, 365) to be used by a Downlink Processor (DLP) for one of said at least one IoT Devices (210, 350); and
      discovery of Application Controller Services.

2. The system of claim 1, wherein at least one said NC Instance (325) comprises highly available storage to persist network session information.

3. The system of claim 1, wherein at least one said NC Instance (325) comprises highly available storage comprising a Mongo Cluster to persist network session information.

4. The system of claim 1, comprising a Key Management Service (315) interfaced with said at least one Application Controller (305).

5. The system of claim 4, wherein said Key Management Service (315) is external.

6. The system of claim 1, wherein only critical events are persisted as part of event processing, all others are stored in a cache and scheduled for persistence.

7. The system of claim 1, wherein at least one of said NC Instances (325) and said AC Instances (305) comprises a Representational State Transfer (REST) (420) web services interface.

8. The system of claim 1, wherein at least one of said AC Instances (305, 310 . . . ) is deployed internally to said NC (325).

9. The system of claim 1, wherein at least one of said AC Instances (305, 310 . . . ) is deployed as an external system.

10. The system of claim 1, wherein at least one of said AC Instances (305) decrypts application uplink messages and encrypts application downlink messages.

11. The system of claim 1, wherein said network database memory comprising Network Database (345) comprises storing IoT Device network session information, IoT Device profiles, and Gateway configuration parameters of said at least one Gateway (GW) device (205, 365).

12. The system of claim 1, wherein Messages are sent from said at least one NC Instance (325) to at least one of said GW devices (205, 365) by a state-full Web Socket connection.

13. The system of claim 11, wherein at least one of said AC instances (305) persists session information on at least one of a Key Management Service (315) and locally in an Application Database.

14. A method for an Internet of Things (IoT) Network Controller/Server comprising:
   providing at least one Application Controller (AC) Instance (305);
   providing a Network Controller Cluster (NCC) (320) interfacing through Load Balancers (335, 340);
   said Network Controller Cluster (320) comprising at least one Network Controller (NC) Instance (325);
   providing a Network Database (345);
   providing a Northbound API (375) through which said at least one Application Controller Instance (305) communicates with said at least one Network Controller Cluster (320);
   providing at least one Gateway (GW) device (205, 365);
   providing a Southbound API (380) through which said at least one Gateway device (205, 365) communicates with said Network Controller Cluster (320);
   providing at least one IoT Device (210, 350) in communication with said at least one Gateway (GW) device (205, 365); and
   providing at least one Uplink Processor (ULP) Instance (430), functions of said at least one ULP Instance (430) comprising:
      handling messages from said GW device (205, 365) to said NC, said messages containing application data and/or session management information;
      establishing at least one session;
      managing security keys between said AC, said NC, and said IoT Device (210, 350);
      managing session parameters with said IoT Device (210, 350) to optimize communication on an RF network;
      deduplication of said messages from said IoT Devices (210, 350) for delivery to said AC;
      nomination of one of said at least one GW device (205, 365) to be used by a Downlink Processor (DLP) for one of said at least one IoT Devices (210, 350); and
   discovery of Application Controller Services.

15. The method of claim 14, comprising:
   providing at least one Downlink Processor (DLP) Instance (450), functions of said at least one DLP Instance (450) comprising:

queuing messages from said NC or said AC to said GWs/Devices;

delivering messages from said NC or said AC to said GWs/Devices;

wherein said messages from said NC contain session configuration information and said messages from said AC contain application data.

16. The method of claim 14, wherein said Southbound API (380) communications comprise:

load-balanced messages across said NC Instances (325) based on IoT Device ID; and wherein said messages are sent from said NC to said GW device (205, 365) via a state-full Web Socket connection to one of said NC instances.

17. The method of claim 14, wherein said Northbound API (380) communications comprise:

load-balanced requests across said NC Instances (325).

18. The method of claim 14, wherein each said NC Instance (325) comprises at least one of:

service discovery (445) and network session management (435).

19. An apparatus for an Internet of Things (IoT) Network Controller/Server comprising:

at least one Application Controller (AC) Instance (305);

a network (225) comprising a Network Controller Cluster (NCC) (320) interfacing through Load Balancers (335, 340);

said Network Controller Cluster (NCC) (320) comprising at least one Network Controller (NC) Instance (325);

a network database memory comprising a Network Database (345);

a Northbound API (375) through which said at least one Application Controller Instance (305) communicates with said at least one Network Controller Cluster (320);

at least one Gateway (GW) device (205, 365) device;

a Southbound API (380) through which said at least one Gateway (GW) device (205, 350) communicates with said Network Controller Cluster (320);

at least one Internet of Things (IoT) Device (210, 350) in communication with said at least one Gateway (GW) device (205, 350); and at least one Uplink Processor (425) comprising a processor device, wherein said at least one Uplink Processor (425) comprises at least one Uplink Processor (ULP) Instance (430), wherein said processor device of said at least one Uplink Processor (425) executes functions of said at least one ULP Instance (430) comprising:

handling messages from said GW device (205, 365) to said NC, said messages containing application data and/or session management information;

establishing at least one session;

managing security keys between said AC, said NC, and said IoT Device (210, 350);

managing session parameters with said IoT Device (210, 350) to optimize communication on an RF network;

deduplication of said messages from said IoT Devices (210, 350) for delivery to said AC;

nomination of one of said at least one GW device (205, 365) to be used by a Downlink Processor (DLP) for one of said at least one IoT Devices (210, 350); and discovery of Application Controller Services.

* * * * *

UNITED STATES PATENT AND TRADEMARK OFFICE
CERTIFICATE OF CORRECTION

PATENT NO. : 10,735,521 B1
APPLICATION NO. : 16/196011
DATED : August 4, 2020
INVENTOR(S) : Jamie R. Woodhead, David L. Kjendal and Randy Alex Houde Page 1 of 1

It is certified that error appears in the above-identified patent and that said Letters Patent is hereby corrected as shown below:

On the Title Page

Item (72) the third inventor should be added and read as follows:
Jamie R. Woodhead, Pelham, NH (US)
David L. Kjendal, Durham, NH (US)
Randy Alex Houde, NH (US)

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*